United States Patent
Fukutani

(10) Patent No.: US 8,998,432 B2
(45) Date of Patent: Apr. 7, 2015

(54) DISPLAY INSTRUMENT

(75) Inventor: Kazuyoshi Fukutani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 13/983,606

(22) PCT Filed: Dec. 15, 2011

(86) PCT No.: PCT/JP2011/079027
§ 371 (c)(1),
(2), (4) Date: Aug. 5, 2013

(87) PCT Pub. No.: WO2012/108101
PCT Pub. Date: Aug. 16, 2012

(65) Prior Publication Data
US 2013/0314945 A1 Nov. 28, 2013

(30) Foreign Application Priority Data

Feb. 7, 2011 (JP) ................. 2011-024054

(51) Int. Cl.
*G01D 11/28* (2006.01)
*F21V 8/00* (2006.01)
*B60K 35/00* (2006.01)

(52) U.S. Cl.
CPC .............. *G02B 6/0011* (2013.01); *G01D 11/28* (2013.01); *B60K 35/00* (2013.01); *B60K 2350/203* (2013.01)

(58) Field of Classification Search
USPC ...................... 362/23.07–23.22, 489
See application file for complete search history.

(56) References Cited

U.S. PATENT DOCUMENTS

| | | | | |
|---|---|---|---|---|
| 4,872,415 A | * | 10/1989 | Nakadozono et al. | 116/288 |
| 6,302,551 B1 | * | 10/2001 | Matumoto | 362/27 |
| 7,357,096 B2 | * | 4/2008 | Tane | 116/288 |
| 8,517,548 B2 | * | 8/2013 | Kato | 362/23.01 |

FOREIGN PATENT DOCUMENTS

| | | |
|---|---|---|
| CN | 101041338 | 9/2007 |
| JP | 2009-236644 | 10/2009 |
| JP | 2009-300292 | 12/2009 |
| JP | 2010-048614 | 3/2010 |

OTHER PUBLICATIONS

Chinese Office Action dated Dec. 24, 2014, Application No. 201180066431.2, partial English translation included, 7 pages.

* cited by examiner

*Primary Examiner* — Sean Gramling
(74) *Attorney, Agent, or Firm* — Rankin, Hill & Clark LLP

(57) ABSTRACT

An instrument includes a substrate; first and second light-emitting parts provided on the substrate; a light guide plate having a first illumination part that is illuminated by first light of the first light-emitting part, and that guides the first light of the first light-emitting part incident thereinto to the first illumination part, which is separated from the first light-emitting part; and a design plate having a second illumination part.

3 Claims, 4 Drawing Sheets

DISPLAY INSTRUMENT

FIELD OF THE INVENTION

The present invention relates to a display instrument.

Priority is claimed on Japanese Patent Application No. 2011-024054, filed Feb. 7, 2011, the content of which is incorporated herein by reference.

BACKGROUND ART

In the related art, for example, an illumination device that uniformly illuminates a dial with light using a light guide body is known (for example, refer to Patent Document 1).

CITATION LIST

Patent Literature

Patent Document 1: Japanese Unexamined Patent Application, First Publication No. 2009-300292

SUMMARY OF INVENTION

Problem to be Solved by the Invention

In a display instrument related to the above related art, the dial and the light guide body are merely uniformly illuminated with the light of the same light-emitting part. Thereby, a problem in that it is difficult to create an innovative visual design by elaborate illumination occurs.

The present invention has been made in view of the above circumstances, and an object thereof is to provide a display instrument that can perform an innovative visual design by elaborate illumination.

Means for solving the Problem

The present invention has adopted the following means in order to solve the above problems and achieve the object.

That is, (1) a display instrument related to an aspect of the present invention includes a substrate; a first light-emitting part and a second light-emitting part which is provided on the substrate; a light guide plate which has a first illumination part that is illuminated by a first light of the first light-emitting part and is separated from the first light-emitting part, and which guides the first light of the first light-emitting part that is incident into the light guide plate to the first illumination part; and a design plate that is arranged parallel to the substrate and that has a second illumination part illuminated from a deep side in a viewing direction by a second light of the second light-emitting part. The light guide plate is provided on a near side of the design plate in the viewing direction and is provided so as to be larger than the second illumination part and covers the second illumination part as seen from the viewing direction. The first illumination part is provided so that at least part of the first illumination part overlaps the second illumination part as seen from the viewing direction The second illumination part is provided so that the second illumination part overlaps a light guide path of the first light from the first light-emitting part to the first illumination part as seen from the viewing direction.

(2) In the display instrument described in the above (1), the light guide plate may have a light introduction part that is arranged to face the first light-emitting part, and the light guide plate may be arranged to incline to the near side in the viewing direction so that an interval from the design plate to the light guide plate increases from the light introduction part toward the first illumination part.

(3) The display instrument described in the above (2) may further include an eaves part that extends from an upper part of the design plate in a vertical direction to the near side in the viewing direction. The first light-emitting part may be provided at a lower position of the light guide plate in the vertical direction, the inclination angle formed between the light guide plate and the design plate is an acute angle, the light guide plate may be installed so as to incline toward the near side in the viewing direction than an orthogonal plane orthogonal to the viewing direction, and the design plate may be installed so as to incline toward the deep side in the viewing direction than the orthogonal plane.

(4) In the display instrument described in any one of the above (1) to (3), regions other than a region of the second illumination part among the regions of the design plate covered with the light guide plate as seen from the viewing direction may be colored in a dark color, the light guide plate may include a cover that covers at least part of an outline part, and the cover may be colored in a dark color.

(5) In the display instrument described in the above (4), the cover may be provided so as not to overlap an edge of the second illumination part as seen from the viewing direction.

Advantageous Effects of Invention

According to the display instrument described in the above (1), the first illumination part can be illuminated without obstructing the second illumination part when the first illumination part is viewed from the viewing direction in a state where the first illumination part does not overlap the second illumination part.

Moreover, the first illumination part and the second illumination part can be independently illuminated, and elaborate illumination can be performed.

Moreover, since the light guide plate is provided on the near side of the design plate, the light guide plate can be viewed so as to be illuminated by a plurality of light sources, and an innovative visual design can be created.

According to the display instrument described in the above (2), the first illumination part and the second illumination part can be viewed while a stereoscopic effect is given thereto, and such an innovative visual design that the second illumination part is present on the light guide plate can be performed.

Moreover, according to the display instrument described in the above (3), even when outside light enters the light guide plate or the design plate, this outside light can be prevented from being reflected in a direction (that is, a direction toward a viewer) opposite to the viewing direction, and viewability can be improved.

Moreover, according to the display instrument described in the above (4), in the portion of the outline part of the light guide plate covered with the cover, the light of the first light-emitting part is prevented from leaking to the outside. Thereby, the outlines of the first illumination part and the second illumination part can be clearly viewed, and an innovative visual design can be created.

According to the display instrument described in the above (5), the edge of the second illumination part can be concealed with the cover with respect to the viewing direction, and such an innovative visual design that the second illumination part is present on the light guide plate can effectively performed.

DESCRIPTION OF EMBODIMENTS

A display instrument related to an embodiment of the present invention will be described below referring to the accompanying drawings.

Figure 1:
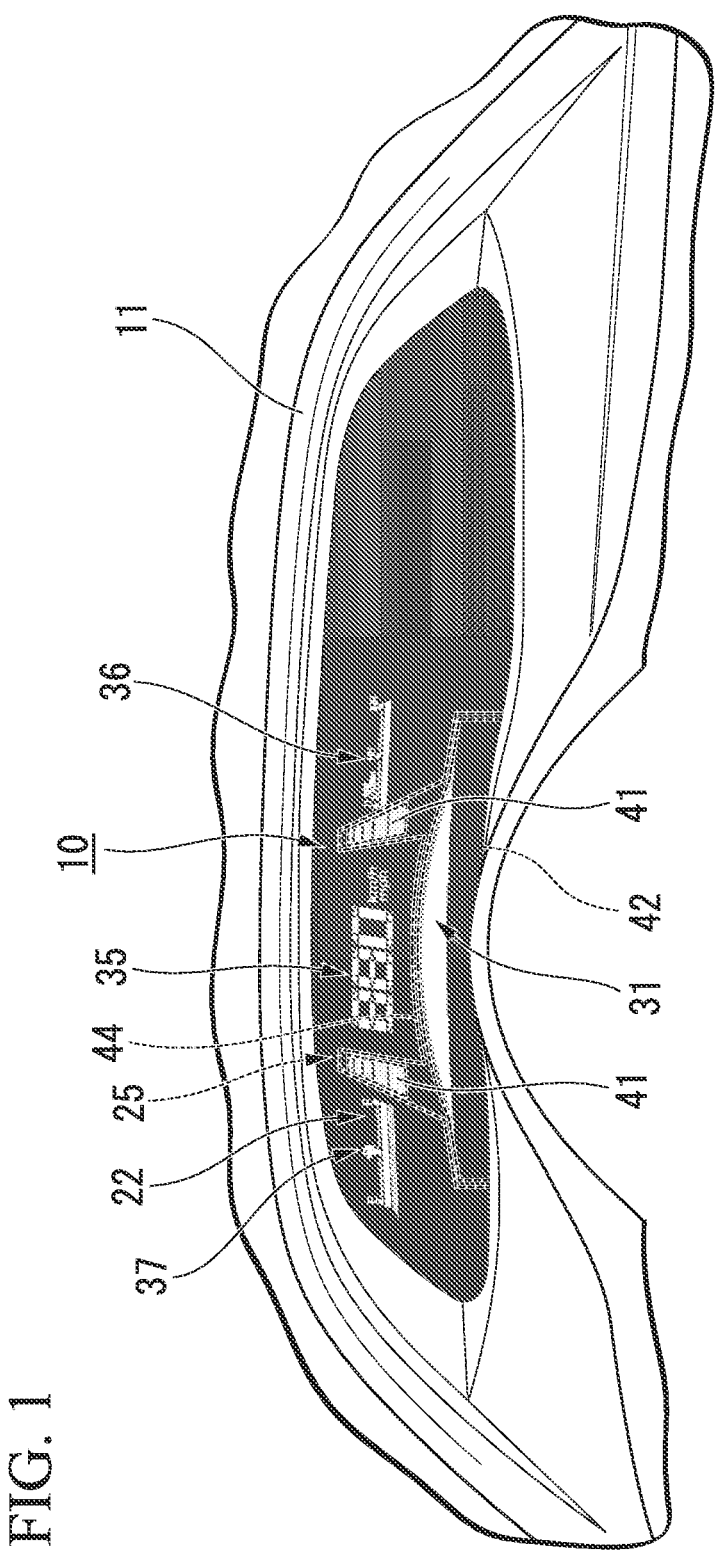
FIG. 1 is a view when a display instrument related to an embodiment of the present invention is seen from the front side of a seat.

A display instrument 10 according to the present embodiment, for example, as shown in FIG. 1, is installed within an instrument panel 11 arranged on the front of a seat (not shown) of a vehicle.

Figure 2:
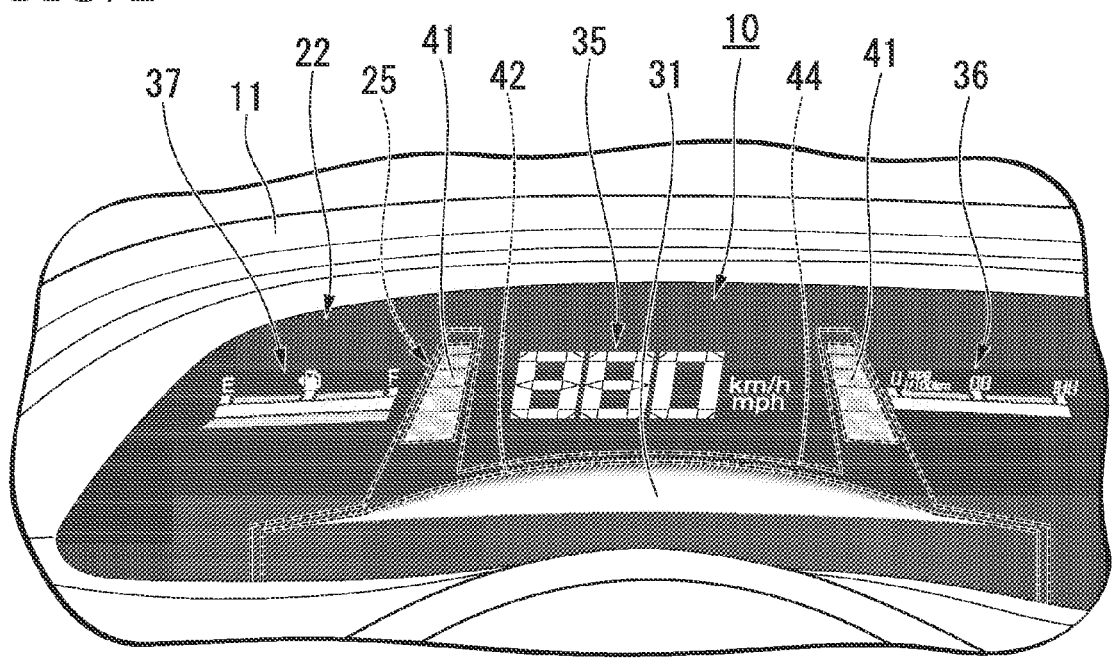
FIG. 2 is a partially enlarged view of the display instrument related to the embodiment of the present invention.
Figure 3:
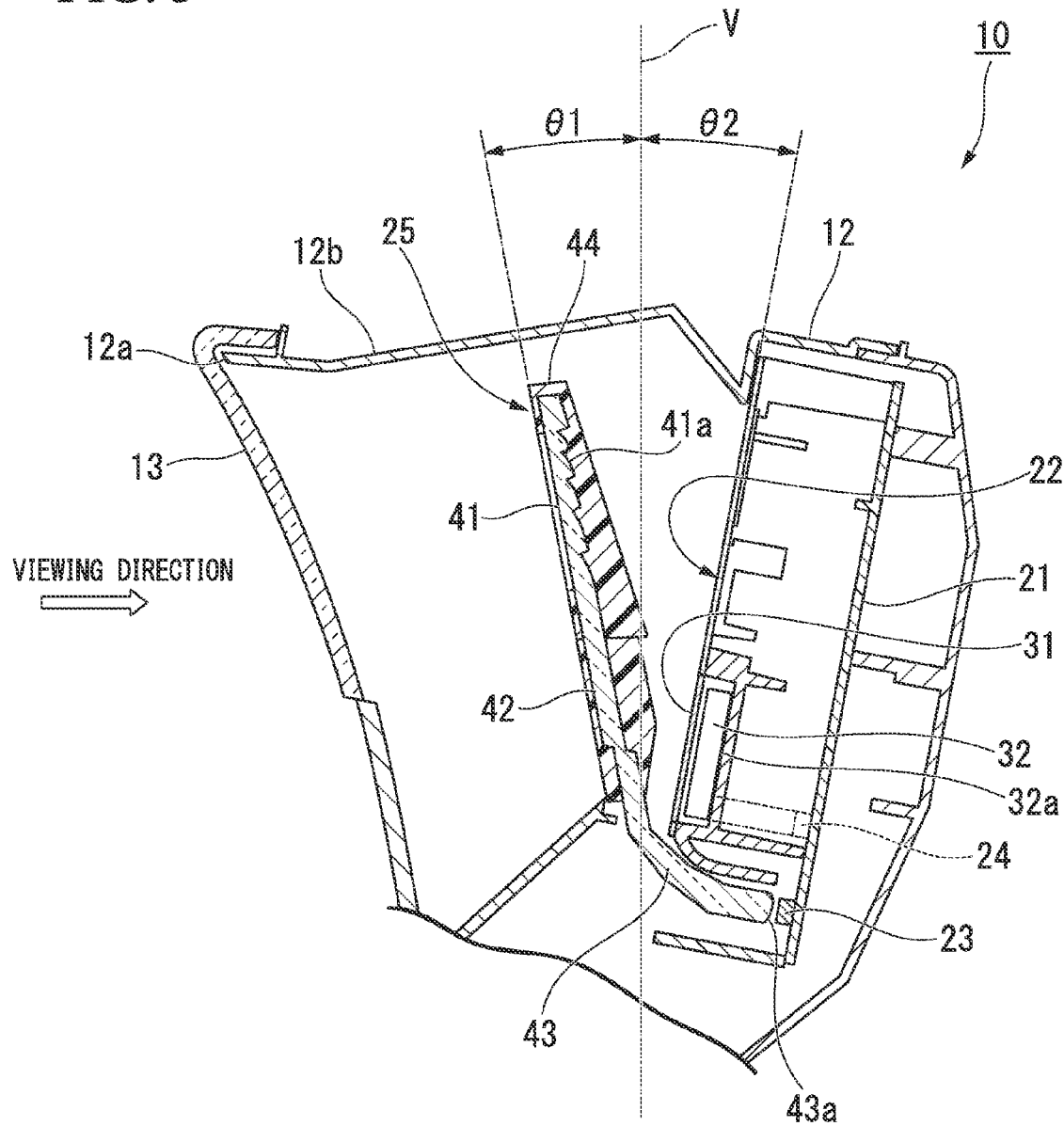
FIG. 3 is a cross-sectional view of the display instrument related to the embodiment of the present invention.

The display instrument 10, for example, as shown in FIGS. 2 and 3 includes a housing 12 that is attachable to the instrument panel 11 of the vehicle, and a transparent cover 13 that covers an opening 12a of the housing 12 that opens toward the seat (not shown) of the vehicle, and that has translucency.

The display instrument 10 is configured so as to house a substrate 21, a design plate 22, two light guide plate light-emitting parts 23 and 23 (first light-emitting parts) and a design plate light-emitting part 24 (second light-emitting part) provided at the substrate 21, and a light guide plate 25 within the housing 12. The light guide plate light-emitting parts 23 and 23 are preferably at lower positions of the light guide plate 25 in the vertical direction.

A wiring pattern is formed on, for example, a glass epoxy base material at the substrate 21, and the substrate 21 is arranged at the back of the design plate 22 as seen from the front side of the seat.

For example, various types of circuit components (not shown), such as resistors and capacitors, and the light guide plate light-emitting parts 23 and the design plate light-emitting part 24 that can emit light in different colors, for example, according to the state of the vehicle are arranged on the substrate 21 so as to be electrically connected to the wiring pattern.

The design plate 22, for example, as shown in FIG. 3, is preferably arranged substantially parallel to the substrate 21, and is installed toward the deep side (that is, the substrate 21 side) in a predetermined viewing direction than an orthogonal plane V orthogonal to the viewing direction so as to incline at a predetermined angle θ2.

The predetermined viewing direction is, for example, an average sight line or the like when the design plate 22 is seen from a passenger who sits down on a seat (not shown) of the vehicle arranged on the front of the design plate 22.

Additionally, the housing 12 preferably includes an eaves part 12b that extends to the near side in the viewing direction from an upper part of the design plate 22 in the vertical direction.

Figure 4A:
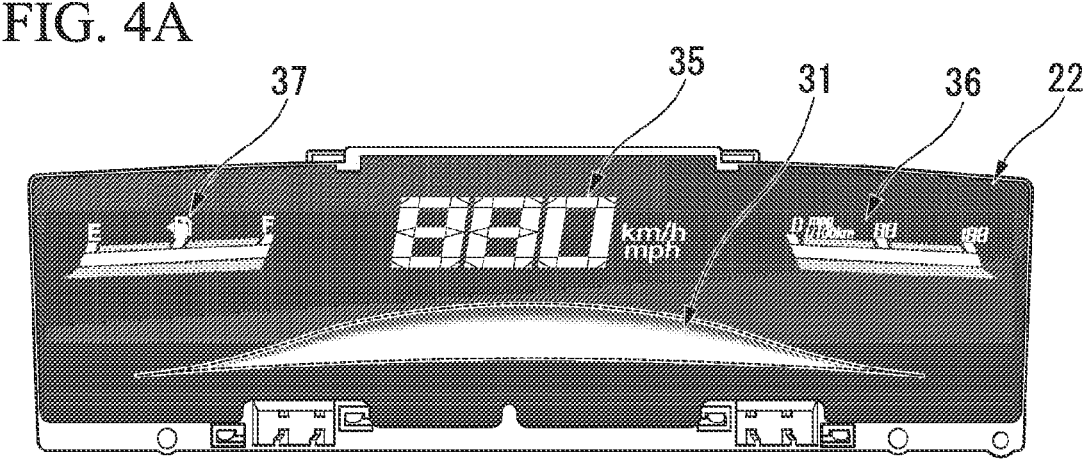
FIG. 4A is a front view showing the display instrument related to the embodiment of the present invention.

The design plate 22, for example, as shown in FIGS. 2, 3, and 4A, includes a design plate illumination part (second illumination part) 31 formed of, for example, translucent members, such as synthetic resin that has colors, such as blue, and translucency.

The design plate illumination part 31 includes a design plate light guide body 32 at the back (deep side in the viewing direction) in the viewing direction.

The design plate light guide body 32 includes a concavo-convex surface 32a. The concavo-convex surface 32a that includes a number of concavo-convex portions is formed on the surface of the light guide body on the back side in the viewing direction. The design plate light guide body 32 internally guides light (second light) of the design plate light-emitting part 24 arranged on the substrate 21 and diffusely reflects the light on the concavo-convex surface 32a. The reflected light by this diffused reflection is distributed toward the design plate illumination part 31, and illuminates the design plate illumination part 31 after being transmitted from the back (deep side in the viewing direction) in the viewing direction.

In addition, the design plate light guide body 32 illuminates the design plate illumination part 31. Specifically, for example, the design plate illumination part 31 is illuminated while illuminance decreases smoothly (in gradations) from a lower central part of the design plate illumination part 31 in the vertical direction toward right-and-left ends and an upper end.

Additionally, the design plate 22, as shown in FIGS. 2 and 4A, includes, for example, a speed display part 35 that displays the speed of the vehicle, at a position above the design plate illumination part 31 in the vertical direction. For example, a right display part 36 that displays the fuel consumption rate or the like of an internal combustion engine (not shown) is arranged on the right of the speed display part 35, and for example, a left display part 37 that displays the remaining fuel of the internal combustion engine (not shown) is arranged on the left of the speed display part 35.

Regions other than the design plate illumination part 31 and the respective display parts 35, 36, and 37 among the regions of the design plate 22 that is viewed from the viewing direction are preferably colored in a dark color.

The light guide plate 25, for example, as shown in FIGS. 2, 3, 4A, and 4B, is formed of, for example, translucent members, such as colorless transparent synthetic resin that has translucency. The light guide plate 25 includes two light guide plate illumination parts (first illumination parts) 41 and 41 illuminated by the light (first light) of the two light guide plate light-emitting parts 23 and 23 arranged on the substrate 21, a light guide plate body 42, and two light introduction parts 43 and 43 that introduce the light of the two light guide plate light-emitting parts 23 and 23 thereinto.

The two light guide plate illumination parts 41 and 41, for example, are arranged at a predetermined interval in the right-and-left direction of the vehicle in an upper part of the light guide plate body 42 in the vertical direction, and protrude toward the upper outside of the vehicle.

Each light guide plate illumination part 41 includes a diffusing surface 41a composed of the concavo-convex surface. The concavo-convex surface of the diffusing surface 41a that includes a number of concavo-convex portions is formed on the surface of the light guide plate illumination part on the back side in the viewing direction.

The two light introduction parts 43 and 43, for example, are arranged at a predetermined interval in the right-and-left direction of the vehicle in a lower part of the light guide plate body 42 in the vertical direction, and protrude toward the lower outside of the vehicle.

Each light introduction part 43 is bent toward the substrate 21 below a lower end of the design plate 22 in the vertical direction, and is formed so that a tip 43a of each light introduction part 43 faces the light guide plate light-emitting part 23 arranged on the substrate 21.

That is, each light guide plate light-emitting part 23 is preferably arranged at a position where the distance between the light guide plate 25 and the design plate 22 (interval) is short, that is, the position where the distance between the light guide plate 25 and the substrate 21 is short.

The light guide plate body 42 is capable of guiding the light of the light guide plate light-emitting part 23, which is introduced thereinto from the light introduction part 43, through the light guide plate body to the light guide plate illumination part 41 that is separated from the light guide plate light-emitting part 23.

That is, the light guide plate 25 introduces the light of each light guide plate light-emitting part 23 arranged on the substrate 21 thereinto from each light introduction part 43, and guides the light into the light guide plate body 42 and each light guide plate illumination part 41 from each light introduction part 43. The light guided through each light guide plate illumination part 41 is diffusely reflected in the diffusing surface 41a of each light guide plate illumination part 41, and the light guide plate 25 distributes the reflected light by the diffused reflection toward the front side of the seat (not shown) of the vehicle.

The light guide plate 25, for example, as shown in FIG. 3, is arranged so as to incline to the near side in the viewing direction such that the distance (for example, horizontal distance or the like) from the design plate 22 increases as moving away from the position of each light guide plate light-emitting part 23 toward each light guide plate illumination part 41 (that is, as getting away from the position of each light introduction part 43 arranged to face each light guide plate light-emitting part 23 toward each light guide plate illumination part 41).

Additionally, the light guide plate 25 is preferably arranged so that, for example, the inclination angle (for example, θ1+θ2 shown in FIG. 3) from the design plate 22 becomes an acute angle. Moreover, the light guide plate 25 is preferably installed so as to incline at a predetermined angle θ1 further toward the near side (that is, the translucent transparent cover 13 side or the front side of the seat of the vehicle) in the viewing direction than the orthogonal plane V orthogonal to the viewing direction.

Figure 4B:
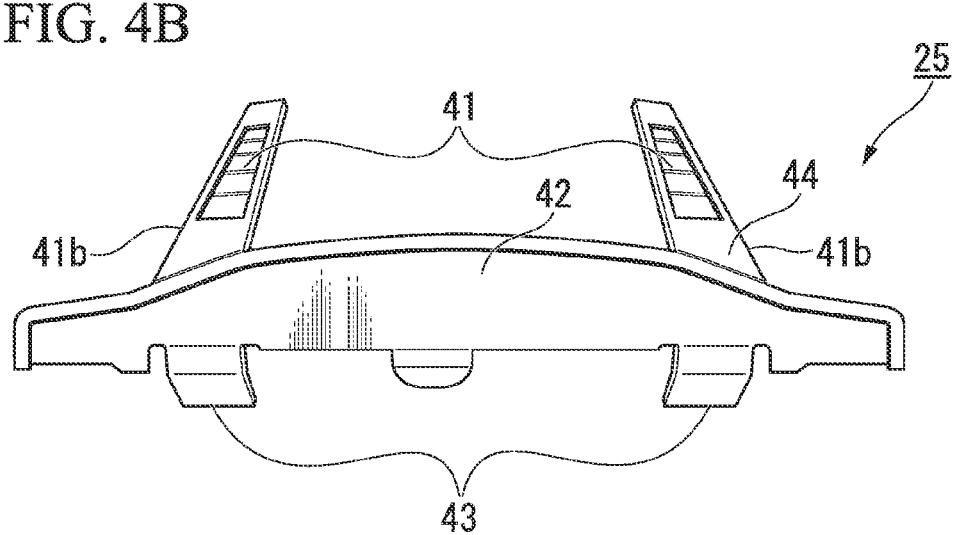
FIG. 4B is a front view showing a light guide plate of the display instrument related to the embodiment of the present invention.
Figure 4C:
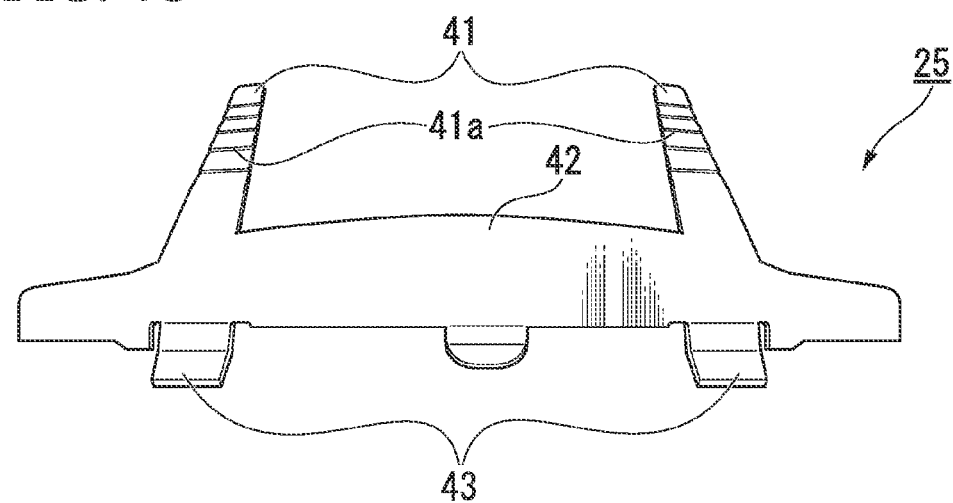
FIG. 4C is a front view showing the light guide plate of the display instrument related to the embodiment of the present invention.

Additionally, the light guide plate 25, for example, as shown in FIG. 4B, is preferably at least, for example, a cover 44 that covers at least some of an outline part 41b, for example, the outline part 41b of the two light guide plate illumination parts 41 and 41 and the outline part 41b other than the lower part of the light guide plate body 42 in the vertical direction.

The cover 44 is preferably colored, for example, in the same dark color as regions other than the design plate illumination part 31 and the respective display parts 35, 36, and 37 among the regions of the design plate 22. The cover 44 prevents the light inside the light guide plate 25 from leaking to the outside from the outline part 41b of the two light guide plate illumination parts 41 and 41 and the outline part 41b other than the lower part of the light guide plate body 42 in the vertical direction.

The light guide plate 25 provided on the near side in the viewing direction with respect to the design plate 22, as shown in FIG. 2, has a size such that the light guide plate 25 covers the whole design plate illumination part 31 when seen from the viewing direction. Specifically, the light guide plate body 42 of the light guide plate 25 is provided so as to be viewed from the viewing direction in a state where the light guide plate body 42 is larger than the design plate illumination part 31 and covers the design plate illumination part 31.

Additionally, each light guide plate illumination part 41 is provided so as to be viewed from the viewing direction in a state where at least part of light guide plate illumination part 41 does not overlap the design plate illumination part 31.

Additionally, a light guide path for the light within the light guide plate 25 is a path for light that is introduced into each light introduction part 43 from each light guide plate light-emitting part 23 and is guided into the light guide plate body 42 and each light guide plate illumination part 41 from each light introduction part 43. The light guide plate 25 is provided so as to be viewed from the viewing direction in a state where the light guide path overlaps the design plate illumination part 31.

For example, the light guide path for the light within the light guide plate 25 is, for example, a region including the light introduction parts 43 and the light guide plate illumination parts 41, each of which makes a pair on the right and left in the right-and-left direction of the vehicle, and the width of the light guide path in the right-and-left direction is a larger width out of the width in the right-and-left direction between upper ends of the light introduction parts 43 and the width in the right-and-left direction between lower ends of the light guide plate illumination parts 41.

The design plate illumination part 31 overlaps the light guide path within the width thereof in the right-and-left direction width in a state where the light guide path overlaps the design plate illumination part 31.

Moreover, the cover 44 of the light guide plate 25 is preferably provided so as to be viewed from the viewing direction in a state where the cover 44 overlaps the edge of the design plate illumination part 31.

That is, the light guide path for light in the region of the light guide plate body 42 of the light guide plate 25 that is not covered with the cover 44 is viewed from the viewing direction in a state where the light guide path overlaps the background of the colored design plate illumination part 31, and the display such that the colored design plate illumination part 31 that is present on the light guide plate 25 is effectively performed.

Moreover, since each light guide plate illumination part 41 inclines to the near side in the viewing direction, the light guide plate illumination part 41 floats from the design plate 22 and is stereoscopically viewed.

As described above, according to the display instrument 10 of the present embodiment, the design plate illumination part 31 and each light guide plate illumination part 41 can be independently illuminated, and elaborate illumination can be performed.

Moreover, the light guide plate 25 is provided on the near side of the design plate 22 in the viewing direction, and the light guide plate body 42 is viewed from the viewing direction so that the design plate illumination part 31 is present on the light guide plate 25 in a state where the light guide plate body 42 overlaps the background of the design plate illumination part 31. Thereby, the light guide plate 25 can be viewed so as to be illuminated by a plurality of light sources, and an innovative visual design can be created.

Moreover, when the positions of the design plate 22 and the substrate 21 are close, for example, when the interval between the design plate 22 and the substrate 21 is about the height dimension of the design plate light-emitting part 24, each light guide plate light-emitting part 23 is arranged at a position where the distance between the light guide plate 25 and the design plate 22 is short, that is, at a position where the distance between the light guide plate 25 and the substrate 21 is short. Therefore, the wiring between each light guide plate light-emitting part 23 and the substrate 21 can be omitted or shortened. Accordingly, the expense required for the configuration of the display instrument 10 can be reduced, the weight of the display instrument 10 can be reduced, and appearance can be improved.

Moreover, the eaves part 12b of the housing 12 can prevent outside light from entering the design plate 22, or can prevent outside light incident onto the design plate 22 from being reflected in a direction (that is, a direction toward the seat of the vehicle and a viewer) opposite to the viewing direction.

Additionally, since the light guide plate 25 is arranged to incline to the near side in the viewing direction, the light guide plate 25 can prevent outside light incident onto the light guide plate 25 from being reflected in the direction (that is, the direction toward the seat of the vehicle and the viewer) opposite to the viewing direction.

Moreover, in the portion of the outline part 41b of the light guide plate 25 covered with the cover 44, the light of each light guide plate light-emitting part 23 guided into the light guide plate 25 is prevented from leaking to the outside. Thereby, the outlines of each light guide plate illumination part 41 and the design plate illumination part 31 can be clearly viewed, and an innovative visual design can be performed.

Moreover, since the cover 44 of the light guide plate 25 is viewed from the viewing direction in a state where the cover 44 overlaps the edge of the design plate illumination part 31, the edge of the design plate illumination part 31 can be covered and concealed with the cover 44 with respect to the viewing direction. As a result, such an innovative visual design that the design plate illumination part 31 is present on the light guide plate 25 can be effectively performed.

In addition, the present invention is not limited to the above embodiment, and various design changes can be made without departing from the scope of the present invention. For example, in the above-described embodiment, each light guide plate illumination part 41 is provided so as to be viewed from the viewing direction in a state where at least a portion thereof does not overlap the design plate illumination part 31. However, the present invention is not be limited to this, but each light guide plate illumination part 41 may be provided so as to be viewed from the viewing direction in a state where the whole light guide plate illumination part does not overlap the design plate illumination part 31.

In this case, each light guide plate illumination part 41 can be illuminated without obstructing the design plate illumination part 31.

In addition, the cover 44 may be omitted in the above-described embodiment.

Even in this case, the light guide plate body 42 is provided so as to be viewed from the viewing direction in a state where the light guide plate body is larger than the design plate illumination part 31 and covers the design plate illumination part 31. Thereby, the outline part 41b from which the light inside the light guide plate 25 may leak to the outside is viewed from the viewing direction in a state where the outline part does not overlap the design plate illumination part 31.

As a result, the design plate illumination part 31 can be prevented from being obstructed by light leakage from the light guide plate 25, or such a display that the design plate illumination part 31 is present on the light guide plate 25 can be prevented from being impaired.

In addition, in the above-described embodiment, the distance (for example, horizontal distance or the like) of the light guide plate 25 from the design plate 22 increases as getting away from the position of each light guide plate light-emitting part 23 toward each light guide plate illumination part 41. However, the present invention is not limited to this, and the distance (for example, horizontal distance or the like) of the light guide plate from the design plate 22 may be constant.

Additionally, in the above-described embodiment, the design plate 22 and the light guide plate 25 may be parallel to the orthogonal plane V orthogonal to the viewing direction.

Additionally, in the above-described embodiment, the cover 44, and regions other than the design plate illumination part 31 and the respective display parts 35, 36, and 37 among the regions of the design plate 22 may be colored in mutually different dark color.

REFERENCE SIGNS LIST

10: DISPLAY INSTRUMENT
11: INSTRUMENT PANEL
12b: EAVES PART
21: SUBSTRATE
22: DESIGN PLATE
23: LIGHT GUIDE PLATE LIGHT-EMITTING PART (FIRST LIGHT-EMITTING PART)
24: DESIGN PLATE LIGHT-EMITTING PART (SECOND LIGHT-EMITTING PART)
25: LIGHT GUIDE PLATE
31: DESIGN PLATE ILLUMINATION PART (SECOND ILLUMINATION PART)
41: LIGHT GUIDE PLATE ILLUMINATION PART (FIRST ILLUMINATION PART)
44: COVER

The invention claimed is:
1. A display instrument comprising:
a substrate;
a first light-emitting part and a second light-emitting part that are provided on the substrate;
a light guide plate that has a first illumination part that is illuminated by a first light of the first light-emitting part and is separated from the first light-emitting part, and which guides the first light of the first light-emitting part that is incident into the light guide plate to the first illumination part; and
a design plate that is arranged parallel to the substrate and that has a second illumination part illuminated from a deep side in a viewing direction by a second light of the second light-emitting part,
wherein the light guide plate is provided on a near side of the design plate in the viewing direction and is provided so as to be larger than the second illumination part and covers the second illumination part as seen from the viewing direction;
wherein the first illumination part is provided so that at least part of the first illumination part does not overlaps the second illumination part as seen from the viewing direction;
wherein the second illumination part is provided so that the second illumination part overlaps a light guide path of the first light from the first light-emitting part to the first illumination part as seen from the viewing direction;
wherein the light guide plate has a light introduction part that is arranged to face the first light-emitting part;
wherein the light guide plate is arranged to incline to the near side in the viewing direction so that an interval from the design plate to the light guide plate increases from the light introduction part toward the first illumination part;
wherein the display instrument further includes an eaves part that extends from an upper part of the design plate in a vertical direction to the near side in the viewing direction;

wherein the first light-emitting part is provided at a lower position of the light guide plate in the vertical direction;

wherein the inclination angle formed between the light guide plate and the design plate is an acute angle; and wherein the light guide plate is installed so as to incline toward the near side in the viewing direction than an orthogonal plane orthogonal to the viewing direction, and wherein the design plate is installed so as to incline toward the deep side in the viewing direction than the orthogonal plane.

2. The display instrument according to claim 1, wherein regions other than a region of the second illumination part among the regions of the design plate covered with the light guide plate, as seen from the viewing direction, are colored in a dark color, wherein the light guide plate includes a cover that covers at least part of an outline part of the light guide plate, and wherein the cover is colored in a dark color.

3. The display instrument according to claim 2, wherein the cover is provided so as to overlap an edge of the second illumination part as seen from the viewing direction.

\* \* \* \* \*